United States Patent
Casati et al.

(10) Patent No.: US 6,358,445 B1
(45) Date of Patent: *Mar. 19, 2002

(54) PROCESS FOR MANUFACTURING MULTILAYERED FOAM ARTICLES

(75) Inventors: Francois M. Casati, Prevessin-Moens; Patrice Bocquel, Etrembieres, both of (FR); Michael J. Brown, Eysins/Vaud (CH)

(73) Assignee: The Dow Chemical Company, Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,719

(22) PCT Filed: Dec. 9, 1997

(86) PCT No.: PCT/GB97/03395

§ 371 Date: Jun. 10, 1999

§ 102(e) Date: Jun. 10, 1999

(87) PCT Pub. No.: WO98/25748

PCT Pub. Date: Jun. 18, 1998

(30) Foreign Application Priority Data

Dec. 10, 1996 (GB) .............................................. 9625594

(51) Int. Cl.[7] .............................................. B29C 44/06
(52) U.S. Cl. ..................................... 264/45.1; 264/46.4
(58) Field of Search ............................... 264/45.1, 46.4

(56) References Cited

U.S. PATENT DOCUMENTS

| 4,073,839 A | | 2/1978 | Burkholder et al. | ....... 264/45.1 |
|---|---|---|---|---|
| 4,190,697 A | * | 2/1980 | Ahrens | ....... 264/46.4 |
| 4,405,681 A | * | 9/1983 | McEvoy | ....... 264/46.4 |
| 4,804,506 A | * | 2/1989 | Okamoto et al. | ....... 264/45.1 |
| 5,019,304 A | * | 5/1991 | Brock et al. | ....... 264/45.1 |
| 5,019,305 A | * | 5/1991 | Brock et al. | ....... 264/45.1 |
| 5,273,695 A | * | 12/1993 | Brown et al. | ....... 264/45.1 |

FOREIGN PATENT DOCUMENTS

| EP | 0 267 490 A | 5/1988 |
|---|---|---|
| GB | 2 233 926 A | 1/1991 |
| WO | 90 14215 A | 11/1990 |

* cited by examiner

Primary Examiner—Allan R. Kuhns (57) ABSTRACT

A process for preparing a multilayered foam article such as an automotive seat is disclosed. A mold is arranged so that the bottom surface of the mold is flat or inclined up to 40 degrees to the horizontal plane. The first liquid foam formulation designed to produce a soft foam is poured into the mold from a mixing head outlet strip-wise across the seating zone of the mold along the line parallel to but near the external wall of the seating zone of the mold. Then, the second liquid foam formulation designed to produce a hard foam is poured into the mold from the same or different mixing head outlet strip-wise across the seating zone of the mold along the line parallel to but nearer to the external wall of the mold than the line of pouring of the first liquid foam formulation. The second liquid foam formulation is then allowed to spread on top of the first liquid foam formulation, the mold is closed and the foames are allowed to rise and cure in the mold. The process produces an article having excellent layered-foam seating area.

10 Claims, 7 Drawing Sheets

PROCESS FOR MANUFACTURING MULTILAYERED FOAM ARTICLES

The present invention relates to the preparation of multilayered polyurethane foam articles by the pouring of different foam formulations into a mold.

Multilayered or multihardness polyurethane foams are defined as layers of flexible foams of different hardness (load bearing) and/or density which have a common flat boundary. These foams are usually used to make seat cushions or squabs which have high SAG factors (that is, the ratio of hardness at high deflection to hardness at low deflection) and superior comfort, especially regarding H-point retention (seat occupant's vertical position).

Various methods are known for the preparation of multilayered polyurethane foams. However the known methods suffer many disadvantages such as, for example, low productivity, thus high production costs; long foam formulations pouring times; commingling of the foam formulations resulting in a deformation of foam layers' boundaries, thus inferior seating comfort for seat occupants.

One method for the preparation of multilayered polyurethane foam seating is described in U.S. Pat. No. 4,190,697. This patent describes a process which involves pouring into a mold the first foam formulation which is a hard foam formulation, allowing it to rise for up to 45 seconds, and then pouring the second foam formulation which is a soft foam formulation on top of the first foam formulation. The second foam formulation (soft foam) goes through the first foam formulation (hard foam) and spreads as a liquid underneath the first foam formulation which has already risen to at least 10 to 80 percent of its potential. This process is based on the principle that the rising foam has lower specific density than the fresh liquid foam formulation. This process is not practical for large industrial productions since it requires a long pouring time and, consequently is not widely used.

Another method for the preparation of multilayered polyurethane foam seating is described in European Patent No. 0'251'659. This patent describes a process which involves pouring sequentially two or more foam formulations, designed to produce two or more foams of differing hardness, onto a given point in the bottom of a seat mold and thereafter allowing the foam formulations to rise and cure. The seat mold is inclined to the horizontal plane and pouring point is located at, or near, the top of the inclined bottom surface of the mold. It is a feature of this process that the formulations are poured sequentially without any waiting time between, therefore in general little or no foaming of any of the formulations takes place on a time scale on which pouring occurs. Although, according to the patent, it would be expected that under such conditions, the formulations would mix, this does not, however, occur and, after curing, a foam seat comprising a discrete layer of the various foams is produced. The discrete foam layers are found to be bonded to one another. In this process various foam formulations, which may, for example, be hard and soft foam formulations, originate from the same outlet on the mixing head producing the formulations. The natural flow of each foam formulation down the inclined surface of the bottom of the mold is relied on to fill the mold evenly. This leads to a problem when such a process is applied to large molds, for example, those used for the manufacture of rear seats for automobiles. In such cases, it is not only difficult to obtain uniform coverage of the bottom surface of the mold, but it is necessary that the formulations have relatively long cream times to ensure that coverage is completed while the formulation(s) are still in an essentially liquid state. Another disadvantage of this process is that the time lag between pouring of two different foam formulations must be kept very short to avoid intermingling of the foam formulations in the lower part of the mold which would result in the deformation of the layers' boundaries.

Another method for the preparation of multilayered polyurethane foam seating is described in European Patent No. 0'279'324. This process involves pouring a foam formulation designed to produce a soft foam onto a given point in the bottom of a seat mold and allowing it to cream up, and then pouring a second foam formulation designed to produce a harder foam next to the first foam formulation at the time when the first foam formulation has reached a suitable density and viscosity so that the first foam formulations is lifted up and enveloped by the second foam formulation. The fact that the first foam formulation must be partially expanded before the second foam formulation is poured into the mold gives the same disadvantages as the process described in U.S. Pat. No. 4,190,697, that is, it is not practical for large industrial productions since it requires long pouring times.

Still another method for the preparation of multilayered polyurethane foam seating is described in European Patent No. 0'393'827. This patent describes a process which involves pouring two different foam formulations strip-wise into the inclined mold from two different outlets which are arranged in a line. The two outlets pour simultaneously different foam formulations while they move across and above the mold. The two outlets are attached to a single robot arm and the distance between them is less than the width of the mold. Although the speed of the robot arm is not indicated in this patent, it is obvious that the time interval between pouring the two different foam formulations is quite short. It has been found that with short time intervals between pouring of the two different foam formulations when the outputs of the foam formulations are increased, or when there is a need to pour the foam formulations very close to the upper side-wall of the mold, problems of turbulence may occur due to the velocity of the two liquids when they hit the bottom surface of the mold. The effect is that the second foam formulation which is poured onto the first foam formulation tends to push the first foam formulation downwards with intermingling of the two foams in the lower part of the mold. The resulting layered-foam article has inferior comfort properties. Moreover, due to the fact that the two pouring outlets are attached to a single robot arm and the foam formulations are poured simultaneously into the mold, the respective waiting and pouring times cannot be adjusted for different mold designs.

It is evident that there is still a need for a process for preparing multilayered foam articles which process is versatile with respect to different mold designs, giving good foam vibration properties and still allowing for fast pouring of liquid foam formulations into a mold to be viable for use on fast moving industrial foam production lines.

It has now been discovered that the problems found in the aforementioned patents can be overcome by certain modifications to the procedure by which the foam formulations are poured into the mold.

In particular, it has surprisingly been discovered that pouring the second liquid foam formulation designed to produce a hard foam onto the bottom mold surface inclined to the horizontal plane at a place which has not been wetted by the first poured liquid foam formulation designed to produce a soft foam, contrary to the teachings of European Patent No. 0'251'659, produces a laminar flowing of the second liquid foam formulation on top of the first foam formulation.

It has also been surprisingly discovered that the strip-wise pouring of liquid foam formulations according to the present invention allows not only for a longer time interval between pouring of the two foam formulations than with the fixed (one place) pouring, but also produces the flow of the second liquid foam formulation on top of the first liquid foam formulation. Thus the two-step pouring regiment can be accommodated on a dual-hardness foaming equipment with only one mixing head. In addition, the two-step strip-wise pouring allows pouring of liquid foam formulations on mold surfaces which are horizontal, and even slightly inclined in the opposite direction of the flow of the liquid foam formulations and still obtain formation of foam layers.

It has also been discovered the two step strip-wise pouring of the liquid foam formulations according to the present invention, whether from a single outlet or from two outlets, permits longer pouring time for one liquid foam formulation than the other liquid foam formulation. This allows control of relative thickness of both foam layers.

It has also been discovered that the mixing head(s) outlet(s) which are normally kept vertical in relation to the horizontal plane can be tilted to change the direction of the foam reactants flows during pouring operation. Surprisingly, the tilting of the mixing head(s) outlet(s) results in increased thickness of the second foam (soft) relative to the first poured foam without changes in liquid foam formulations outputs or in pouring times.

It has also been discovered that layered foam articles produced by the process of the present invention have good vibration properties.

Accordingly, the present invention concerns a process for preparing a multilayered foam article in a mold arranged so that the bottom surface of the mold is flat or inclined up to 40 degrees, preferably between 0.1 and 15 degrees, to the horizontal plane by foaming and curing a first liquid foam formulation and a second liquid foam formulation in the zone of the mold corresponding to a seating area of the multilayered article, characterized in that the process comprises the following steps:

(a) pouring the first liquid foam formulation into the mold strip-wise across a zone of the mold from a mixing heat outlet; and (b) pouring the second liquid foam formulation into the mold strip-wise across said zone of the mold, from the same or a different mixing head outlet, parallel to the pouring of the first liquid foam formulation but spaced therefrom such that the second liquid foam formulation contacts the mold where the mold has not been wetted by the first liquid foam formulation and allowing the second liquid foam formulation to spread on top of the first liquid foam formulation.

Where the article has a seating zone, said steps are preferably carried out by:

(a) pouring, across the seating zone of the mold, strip-wise from a mixing head outlet, the first liquid foam formulation designed to produce a soft foam into the mold along the line parallel and near to the external wall of the seating zone of the mold; and (b) pouring, across the seating zone of the mold, strip-wise from the same or different mixing heat outlet, the second foam formulation designed to produce a hard foam into the mold parallel to but nearer to the external wall of the mold than the line of pouring of the first liquid foam formulation and allowing the second liquid foam formulation to spread on top of the first liquid foam formulation.

The present invention solves problems of the aforementioned prior art and provides a process for preparing multilayered foam articles which is versatile with respect to different mold designs, gives a layered foam article with a well defined common flat boundary between the foam layers and good foam vibration properties, and still allows for fast pouring of liquid foam formulations into a mold to be viable for use on fast moving industrial foam production lines.

The process of the present invention can be operated either in a mold having the bottom surface flat to the horizontal plane or in the mold having the bottom surface inclined from the back to the front of the mold at an angle of between 0.1 and 40 degrees to the horizontal plane. This inclination of the mold bottom surface may be achieved by actually tilting the mold or by employing a mold which has been manufactured with an inclined bottom surface. In fact, for most conventional automobile seat molds, the incline in the mold running from the back to the front of the seat is sufficient for the purposes of this invention. Preferably, the angle of incline is 4 to 20 degrees, most preferably 5 to 12 degrees.

The process of the present invention is particularly applicable to automobile seat molds, for making seats and back rests such as those which comprise a central seating area arranged between two supporting side rolls.

Low or high pressure, up to 250 bars, single-mixing head or multiple mixing heads mounted on a 5-axes robot arm, or on a 2-axes manipulator are suitably used in the process of the present invention. A single mixing head capable of pouring two different foam formulations sequentially, or multiple mixing heads with independent manipulators, can be used in the process of the present invention. Mixing heads having 2 or more, up to 8, preferably 2 to 4, additives and polyol blends streams and 1 or 2 isocyanate streams, are suitable for use in the process of the present invention. The speed of mixing heads can be varied during the pouring of different foam formulations or the mixing heads can even be stopped for a short interval of time at some point above the mold to increase pouring time in a particular zone in the mold.

If multiple mixing heads are used, the distance between outlets and their respective positions can be varied depending on the molding conditions.

In one embodiment of the present invention, the liquid foam formulation designed to produce foams of different hardness (load bearing) are poured simultaneously from at least two mixing heads outlets strip-wise into the seating zone of the mold along different lines while the mixing heads move above and across the seating zone of the mold.

In another embodiment of the present invention, the first liquid foam formulation designed to produce a soft foam is poured strip-wise into the mold along the line parallel and near to the external wall of the seating zone of the mold and after an interval of from 0.05 to 1 0 seconds, the second liquid foam formulation designed to produce a hard foam is poured strip-wise into the mold along the line parallel to but nearer to the external wall of the mold than the line of pouring of the first liquid foam formulation.

Still in another embodiment of the present invention, the first liquid foam formulation designed to produce a soft foam is poured from a mixing head outlet strip-wise along a line parallel and near to the external wall of the seating zone of the mold and then the second liquid foam formulation designed to produce a hard foam is poured from the same or different mixing head outlet strip-wise along the line parallel to but nearer the external wall of the mold than the line of pouring of the first liquid foam formulation in the opposite direction to the direction of pouring of the first liquid foam formulation.

Still in another embodiment of the present invention, the liquid foam formulations designed to produce foams of different hardness are poured sequentially from at least two mixing heads outlets strip-wise into the seating zone of the mold along different lines across the seating zone of the mold.

Yet in another embodiment of the present invention, the mold moves relative to the mixing head(s) outlet(s) during the pouring of the liquid foam formulations.

Normally, the mixing heads are kept vertical relative to the horizontal plane while the liquid foam formulations are being poured into the mold. However, the mixing heads outlets can be tilted (inclined) relative to the vertical plane while the liquid foam formulations are being poured into the mold.

The speed of movement of the mixing heads outlets above the mold or the speed of movement of the mold relative to the mixing heads can vary between 0.1 and 150, preferably between 0.5 and 30 m/minutes The foam formulations to be used in the present invention are suitably polyurethane foam formulations, although it is envisaged that the process of the present invention could be applicable to other polymer foam systems such as, for example, polyurea.

Polyurethane foams are well known in the art and comprise the product obtained by mixing a polyfunctional isocyanate with a polyfunctional active hydrogen containing compound (for example, a polyether polyol) in the presence of a blowing agent and allowing them to react under controlled conditions of temperature, pressure and catalysts. In the process of the present invention, such mixtures are generated in the mixing head and then poured into the mold through the outlet before the mixture has started to rise, that is, while the foam formulation is still in an essentially liquid state.

The process of the present invention can be used with any type of flexible polyurethane foam formulations including "hot-cure" and "cold-cure" formulations.

The polyurethane foam formulations useful in the process of the present invention are those producing flexible foam, most preferably flexible HR (high resilience) foams. In such a case, two streams are fed to the mixing head; one comprising a formulated polyol, that is, some or all of polyols, polymer polyols, blowing agent, catalysts, silicone surfactants, blowing agents and other additives; the other comprising the polyisocyanate.

Any known polyether polyol, blends of polyether polyols, copolymer polyols (such as, for example, SAN, PHD, PIPA), blends of copolymer polyol, blends of polyols with copolymer polyols can be used in the process of the present invention.

Any known organic polyisocyanate can be used in the process of the present invention. These polyisocyanates include those containing at least about 2 isocyanate groups per molecule, preferably, those containing an average of from 2.0 to 3.0 isocyanate groups per molecule. The preferred polyisocyanates used in the practice of this invention are aromatic polyisocyanates and include the toluene diisocyanates, especially mixtures of the 2,4- and 2,6-isomers such as those containing 65 percent of the 2,4-isomer and 35 percent of the 2,6-isomer (TDI 65/35), and those containing 80 percent of the 2,4-isomer and 20 percent of the 2,6-isomer (TDI 80/20); and polyisocyanate mixtures comprising 2,4'- or 4,4'-methylene diphenylisocyanate (MDI); hexamethylenediisocyanate (HMDI); polymeric MDI; and isocyanate-terminated prepolymers thereof. Mixtures of two or more polyisocyanates can also be used in the process of the present invention. The polyisocyanates can be used at all known ratios.

Any known catalyst used in the preparation of polyurethanes such as, for example, amines and metal salts, alone or in combination, can be used in the process of the present invention. The catalysts are generally used in a quantity of between 0.002 and 10 percent by weight, based on the total quantity of polyol.

Water is used as the main blowing agent in the process of the present invention at the level of from 0.5 to 10, preferably from 2 to 6 parts per hundred parts of polyol. Auxiliary blowing agents such as carboxylic acids or organic or inorganic compounds that liberate gas by reaction with polyisocyanate or under effect of heat, and inert gases such as carbon dioxide, can also be used in the process of the present invention.

Any crosslinking agent known in the preparation of polyurethanes such as, for example, glycerol, diethanolamine (DEOA) and triethanolamine (TEOA) can be used in the process of the present invention. The crosslinking agent is used in a quantity known to a person skilled in the polyurethane art.

Any type of known foam modifiers, such as those described in U.S. Pat. No. 4,686,240 can be used in the process of the present invention. The foam modifiers are used in a quantity known to a person skilled in the polyurethane art.

Other known additives such as, for example, silicone surfactants, pigments, fillers, and plasticizers can also be used in the process of the present invention. The additives are used in a quantity known to a person skilled in the polyurethane art.

Temperature of the liquid foam formulations (polyol and polyisocyanate components) can vary between 10 and 80, preferably between 15 and 35, degrees Centigrade.

The flexible polyurethane foam formulations used in the process of the present invention are preferably chosen such that they differ in hardness (load bearing) from each other. It is further preferred that such formulations differ in hardness by virtue of their content of one or more of the following: (a) polyols, (b) polyisocyanates with a functionality greater than two, that is, with more than 2 isocyanate groups per molecule, (c) active hydrogen-containing compound which may be a chain extender or crosslinker, and (d) blowing agent. In the context of the present invention, the soft foam has lower hardness (load bearing) than the hard foam.

During pouring operation, molds are kept at a temperature ranging between 20 and 80, preferably between 35 and 75, degrees Centigrade. Molding in a fabric shaped inside the mold, with or without insulating films or foam interliners, such as described in U.S. Pat. No. 4,755,411, is also possible with the process of the present invention.

The molded polyurethane foam articles are cured at a temperature of between room temperature and 250 degrees Centigrade conveniently for a period of time between 2 and 20 minutes, before demolding.

The following designations, symbols, terms and abbreviations are used in the Examples below:

CP-6001 is a glycerol initiated polyol (having a Molecular Weight of 6,000 and an EO content of 75 percent) sold by The Dow Chemical Company under the trademark VORANOL CP 6001.

CP-1421 is a cell opener sold by The Dow Chemical Company under the trademark VORANOL CP 1421.

Dabco 33LV is a 33 percent solution of triethylene diamine in dipropylene glycol sold by Air Products and Chemicals Inc. under the trademark DABCO 33LV.

Dabco 8154 is an amine catalyst sold by Air Products and Chemical Inc. under the trademark DABCO 8154.

Niax A-1 is 70 percent bis(2-dimethylaminoethyl)ether solution in DPG old by OSi Specialties Inc.

Niax A-4 is an amine catalyst sold by OSi Specialties Inc.

DIPA is diisopropanolamine (containing 90 percent diisopropanolamine and 10 percent water).

TIPA is triisopropanolamine (containing 90 percent triisopropanolamine and 10 percent water).

DC-5043 is a surfactant sold by Air Products and Chemicals Inc. under the trademark Dabco 5043.

B-4113 is a silicone surfactant sold by Th. Goldschmidt under the trademark Tegostab B-4113.

B-4690 is a silicone surfactant sold by Th. Goldschmidt under the trademark Tegostab B-4690.

NE-106 is an MDI prepolymer sold by The Dow Chemical Company under the trademark SPECFLEX NE 106.

BRIEF DESCRIPTION OF THE DRAWINGS

The invention defined above will now be illustrated with reference to the following Examples which make reference to the accompanying drawings in which.

DETAILED DESCRIPTION OF THE INVENTION

EXAMPLE 1

Figure 5:
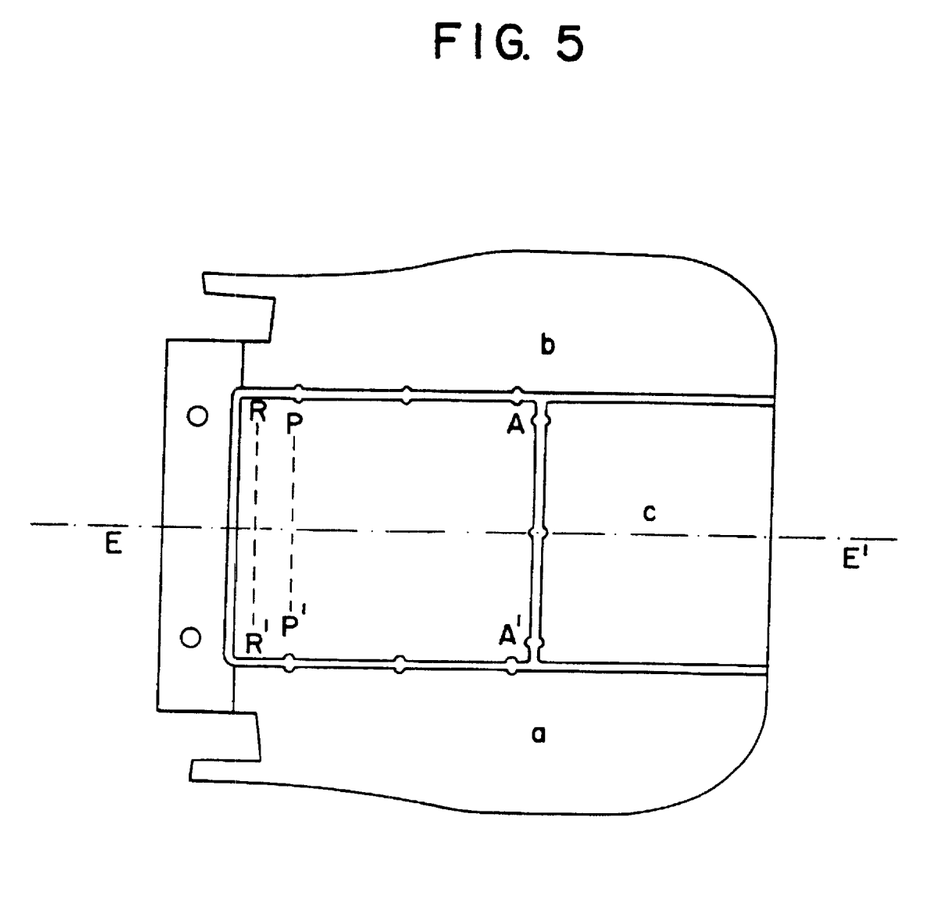
FIG. 5 is a top plan view of another front seat mold.

An automotive seat mold (1) shown in FIG. 5 comprising a central seating zone defined by rectangular A, A', R and R', two side-rolls zones (a, b), and a thigh support zone (c) was employed. The mold was made of aluminum and arranged so that the bottom surface was inclined at an angle beta of 4 degrees to the horizontal plane. The inside surfaces of the mold kept at 55 degrees Centigrade were sprayed with the LK 260 mold release agent sold by Th. Goldschmidt. The two mixing heads (3,3') with outlets (4,4') were connected to respectively a Krauss Maffei RIMSTAR 40/10 and a Krauss Maffei KK 10-5/5 machine. The two mixing heads outlets were mounted on a 5-axes ASEA 90 robot arm with the mixing head outlets separated by a distance of 12 cm. With this arrangement the mixing heads outlets were used to dispense respectively soft and hard liquid foam formulations. The two mixing heads outlets were in vertical position at the distance of 40 mm above the bottom surface of the mold during the pouring operation. The actual composition of the foam formulations are given in Table I.

The operating conditions were as follows: The polyol stream temperature was 30 degrees Centigrade. The polyisocyanate stream temperature was 22 degrees Centigrade. The pressure for both polyol and polyisocyanate streams was 170 bars. Total output for foam formulation A was 214 g/s and for foam formulation B was 172 g/s. Total weight of foam formulation A poured into the mold was 1355 g and total weight of foam formulation B poured into the mold was 250 g.

Figure 8:
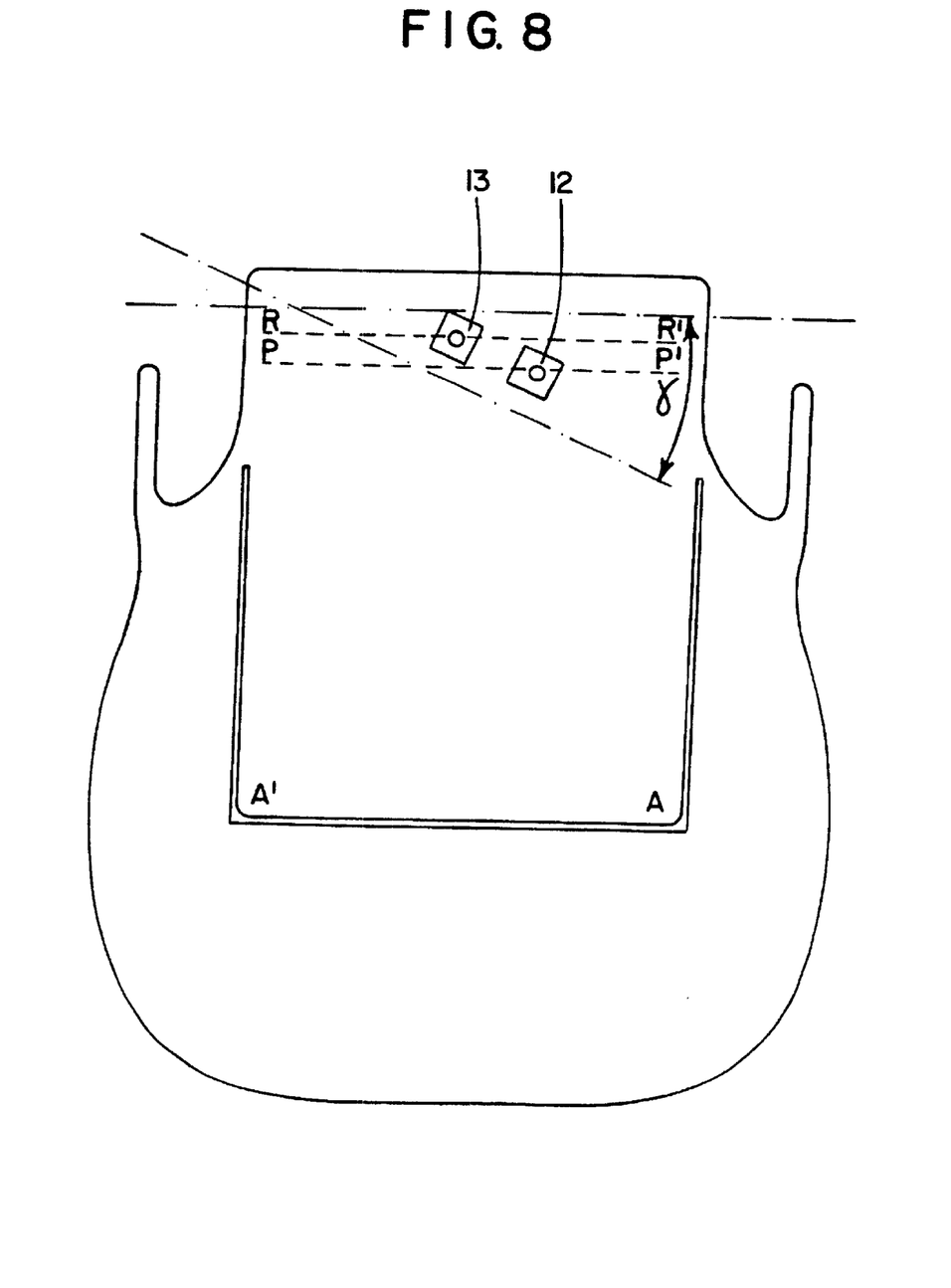
FIG. 8 is a top plan view of the mold shown in FIG. 5 showing two mixing heads aligned at an angle of 25 degrees in relation to the line parallel to the external wall the seating zone of the mold.

The pouring procedure was as follows: The two vertical mixing heads (3,3') with outlets (4,4') were arranged to form an angle γ of 25 degrees with the external wall (5) of the seating zone of the mold. This arrangement of the mixing heads outlets is schematically illustrated in FIG. 8 where the two mixing heads are identified with numerals 13 and 12, respectively. The soft foam formulation A was poured from the mixing head outlet (12) and the hard foam formulation B was poured from the mixing head outlet (13). After filling the side-rolls zones (a, b) and the thigh support zone (c), which is separated from the seating zone by a dividing wall (6), with the foam formulation A, the two foam formulations A and B were poured simultaneously and strip-wise from the two mixing heads outlets into the seating zone of the mold. The first foam formulation A was poured along the line P–P' while the second foam formulation B was poured along the line R–R' which was closer to the external wall of the seating zone of the mold. The robot arm speed was about 14 m/minute during the strip-wise pouring of the foam formulations.

Figure 6:
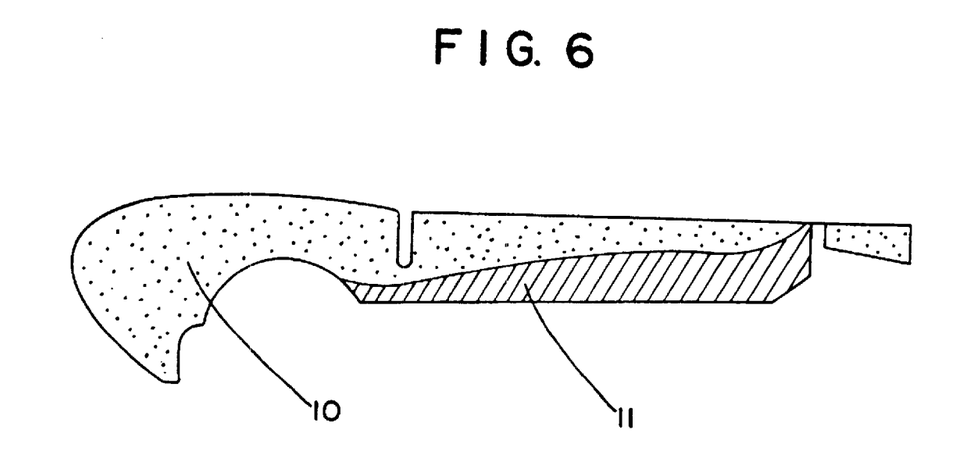
FIG. 6 is a cross-section of a molded foam article according to the present invention made in the mold shown in FIGS. 3 and 5.

After pouring of both foam formulations was completed, the mold was closed with the lid (2), and the foams were allowed to rise and cure. FIG. 6 shows the cross-section taken along the line E–E' shown in FIG. 5 of the resulting demolded seat cushion. The resulting demolded foam seat cushion has an excellent flat layer of a soft foam (8) on top of a hard foam (9). The hard foam layer was 40 mm thick and the soft foam layer was 30 mm thick measured at 14 cm from the external side of the seating zone.

Surprisingly, with this pouring technique the second foam formulation B (hard foam) although was poured on a place into the mold which has not been wetted by the first foam formulation A (soft foam), flows on top of the first foam formulation and forms a regular and flat layer.

TABLE I

| Formulation | | A (soft) | B (hard) | C (soft) | D (hard) |
| --- | --- | --- | --- | --- | --- |
| CP-6001 | parts | 98 | 98 | 100 | 100 |
| CP-1421 | parts | 2 | 2 | none | none |
| Water | parts | 3.275 | 3.275 | 3.4 | 3.4 |
| DIPA | parts | 1.25 | 1.25 | none | none |
| TIPA | parts | none | none | 1.0 | 1.0 |
| B-4690 | parts | none | none | 1.1 | 1.1 |
| DC-5043 | parts | 0.6 | 0.6 | none | none |
| B-4113 | parts | 0.4 | 0.4 | none | none |
| Dabco 33LV | parts | 0.5 | 0.5 | 0.4 | 0.4 |
| Niax A-1 | parts | 0.075 | 0.075 | none | none |
| Niax A-4 | parts | none | none | 0.15 | 0.15 |
| Dabco 8154 | parts | none | none | 0.4 | 0.4 |
| NE-106 | parts | 52.5 | 68.5 | 49 | 71.8 |
| NE-106 | Index | 80 | 105 | 75 | 110 |

EXAMPLE 2

This example illustrates another embodiment of the present invention. The mold, the mixing head(s) outlet(s), the processing conditions and foam formulations used were as described in Example 1 except that the 2 foam formulations were poured sequentially. As shown in FIG. 8, the pouring procedure was as follows: The first foam formulation A (soft foam) was poured strip-wise from the mixing head outlet (12) along the line P–P'. Then, the robot arm was moved to bring the mixing heads outlets back to their original position. After waiting for 0.5 seconds, the second foam formulation B (hard foam) was poured strip-wise from the mixing head outlet (13) along the line R–R'. Since the speed of the robot arm is the same as in Example 1 and the width of the seating zone is 350 mm, it had been calculated that over 3 seconds had been spent between pouring of both foam formulations.

The resulting demolded seat cushion has a flat layer of a soft foam on top of the hard foam as uniform as the one in Example 1.

Comparative Example 1

Figure 7:
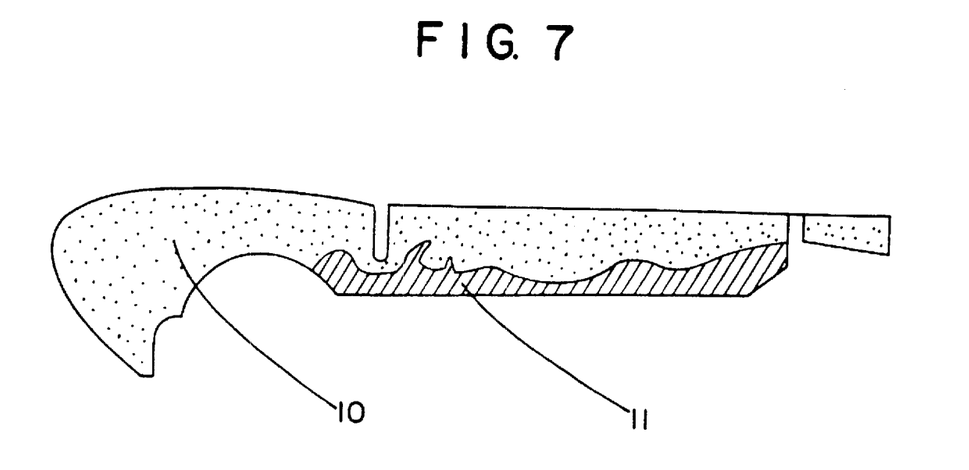
FIG. 7 is a cross-section of a molded foam article made according to a prior art process.

The mold, the mixing heads, the processing conditions and foam formulations used were as described in Example 1 except that the two foam formulations were poured according to the teaching of European Patent No. 0'393'827, that is, the two foam formulations were poured simultaneously from the two mixing heads outlets (arranged in a line) strip-wise along the line R–R' of the mold shown in FIG. 5. The two foam formulations intermingled near the dividing wall A–A'. The hard foam layer was only 35 mm thick in comparison with the 40 mm thickness of the hard foam layer obtained by the process of the present invention. It is evident that the prior art process of European Patent No. 0'393'827 produces an inferior layered foam seat cushion due to the intermingling of the two foam formulations and lower thickness of the hard foam layer which results in a lower support or sag factor. The resulting demolded seat cushion is illustrated in FIG. 7.

EXAMPLE 3

The mold, the mixing heads outlets, the processing conditions and foam formulations used were as described in Example 1 except that the two mixing heads dispensing the two foam formulations were aligned so that they formed an angle γ of 90 degrees with the external wall of the seating zone of the mold. Such arrangement of the two mixing heads outlets resulted in pouring foam formulation B (hard foam) almost 12 cm above foam formulation A (soft foam). The resulting demolded seat cushion has a flat layer of a soft foam on top of the hard foam.

EXAMPLE 4

Figure 1:
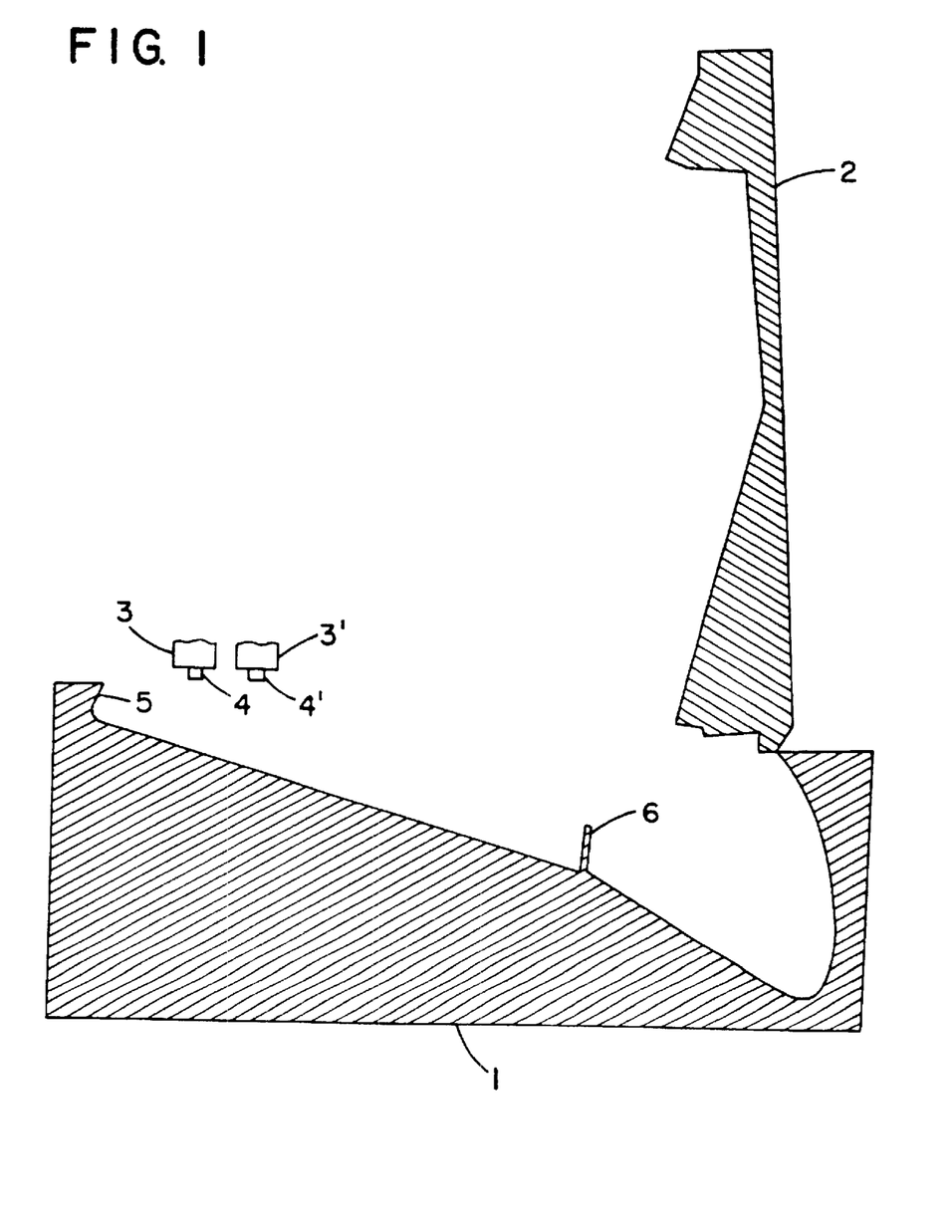
FIG. 1 is a side view of a front seat mold showing pouring of two liquid foam formulations from vertically positioned mixing heads outlets.
Figure 2:
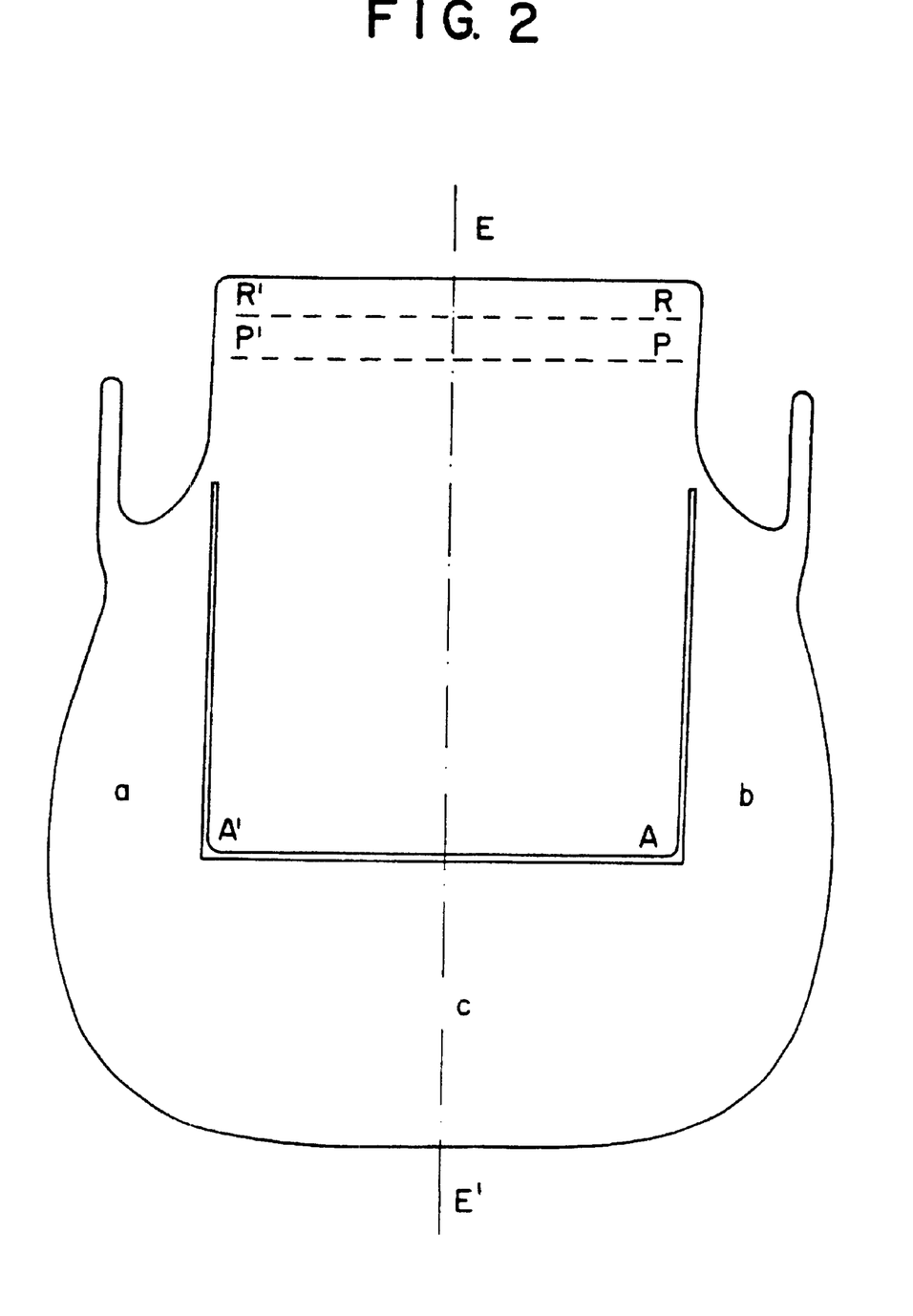
FIG. 2 is a top plan view of the front seat mold shown in FIG. 1.

An automotive seat mold shown in FIGS. 1 and 2 was employed. The mold comprised a central seating zone defined by rectangular R, R', P and P', two side-roll zones (a, b) and a thigh support zone (c) as illustrated in FIG. 2. The mold was made of aluminum and arranged so that the bottom surface was inclined at an β of 3 degrees to the horizontal plane. The inside surfaces of the mold were kept at 60 degrees Centigrade sprayed with the LK 260 mold release agent sold by Th. Goldschmidt. The two mixing heads (3, 3') with outlets (4, 4') were connected to respectively a Krauss Maffei RIMSTAR 40/10 and a Krauss Maffei KK 10-5/5 machine. The two mixing heads outlets were mounted on a 5-axes ASEA 90 robot arm with the mixing heads outlets separated by a distance of 12 cm. The two mixing heads outlets were in a vertical position to the horizontal plane while dispensing liquid foam formulation C (soft foam) and liquid foam formulation D (hard foam), respectively. The actual composition of the foam formulations are given in Table I.

The operating conditions were as follows: The polyol stream temperature was 30 degrees Centigrade. The polyisocyanate stream temperature was 22 degrees Centigrade. The pressure for both polyol and polyisocyanate stream was 160 bars. Total output for foam formulation C was 214 g/s and for foam formulation D was 150 g/s.

The soft foam formulation C was poured from the mixing head outlet (4) and the hard foam formulation D was poured from the mixing head outlet (4'). After filling the side-roll zones and the thigh support zone (c) with the foam formulation C, the 2 foam formulations C and D were poured simultaneously and strip-wise from the 2 mixing heads outlets into the seating zone of the mold. The first foam formulation C was poured along the line P–P' while the second foam formulation D was poured along the line R–R' which was closer to the external wall of the seating zone of the mold. The robot arm speed was about 14 m/minute during the strip-wise pouring of the foam formulations.

Figure 4A:
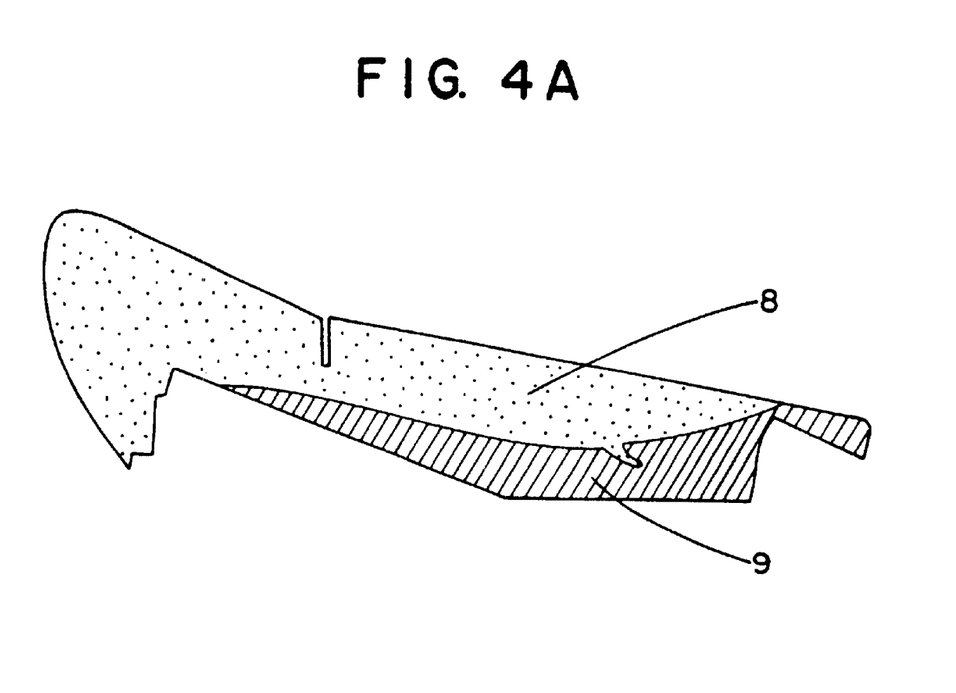
FIGS. 4A and 4B are cross-sections of molded foam articles made in the mold shown in FIGS. 1 and 2.

After pouring of both foam formulations was completed, the lid of the mold was closed, and the foams were allowed to rise and cure. The resulting demolded seat cushion had a weight of 1,440 grams and a flat layer of a soft foam (8) on top of a hard foam (9) as illustrated in FIG. 4A. The hard foam layer was 45 mm thick and the soft foam layer was 35 mm thick measured at 14 cm from the external side of the seating zone.

EXAMPLE 5

Figure 3:
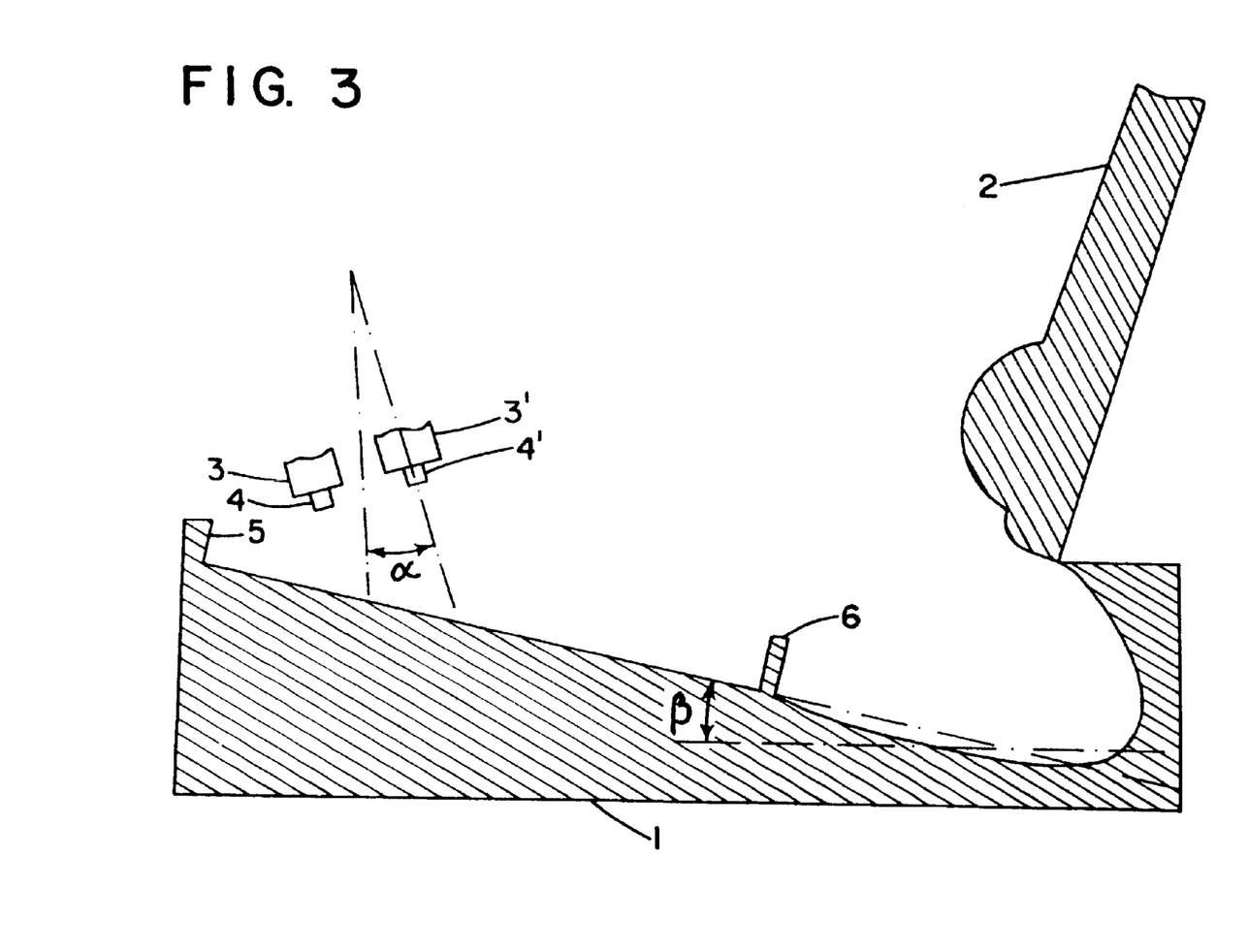
FIG. 3 is a side view of another front seat mold showing pouring of two liquid foam formulations from mixing heads outlets tilted in relation to the vertical plane.

The mold, the mixing heads, the processing conditions, and foam formulations used were as described in Example 4 except that the two mixing heads outlets dispensing the two foam formulations were tilted at an angle α to the vertical plane of 8 degrees in the direction of the slope of the bottom surface of the mold as illustrated in FIG. 3.

The resulting demolded seat cushion had a weight of 1,432 grams and an excellent flat layer of a soft foam on top of the hard foam. The hard foam layer was 50 mm thick and the soft foam layer was 30 mm thick measured at 14 cm from the external side of the seating zone.

EXAMPLE 6

The mold, the mixing head(s) outlet(s), the processing conditions, and the foam formulations used were as described in Example 4 except that the two mixing head(s) outlets dispensing the two foam formulations were tilted at an angle a to the vertical plane of 14 degrees in the direction of the slope of the bottom surface of the mold as illustrated in FIG. 3.

The resulting demolded seat cushion had a weight of 1,430 grams and an excellent flat layer of a soft foam on top of the hard foam. The hard foam layer was 52 mm thick and the soft foam layer was 28 mm thick measured at 14 cm from the external side of the seating zone.

EXAMPLE 7

The mold, the mixing heads outlets, the processing conditions and foam formulations used were as described in Example 4 except that the two mixing heads outlets dispensing the two foam formulations were tilted at an angle α to the vertical plane of 25 degrees in the direction of the slope of the bottom surface of the mold as illustrated in FIG. 3.

Figure 4B:
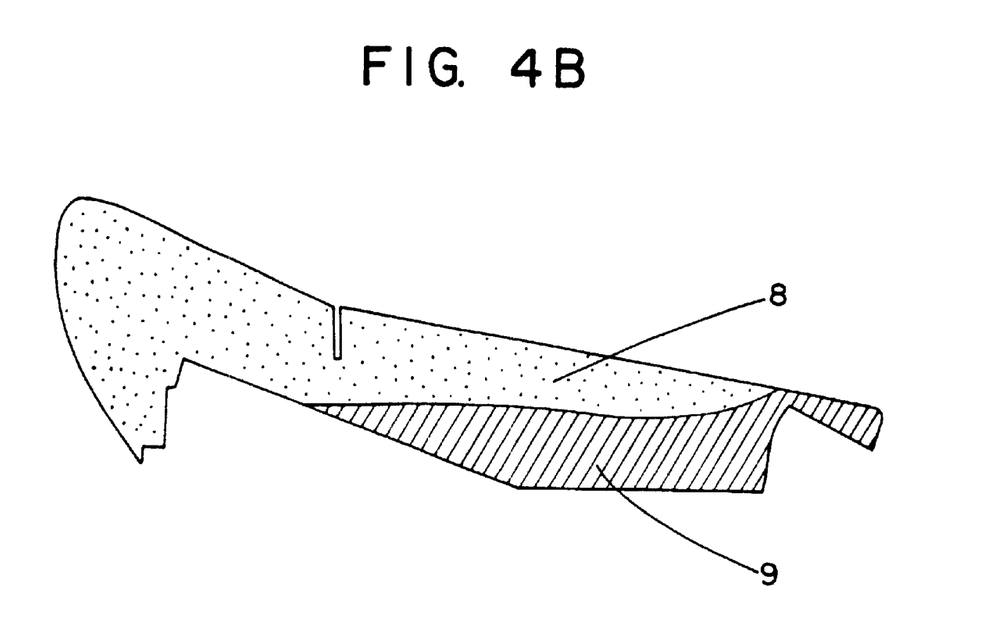

The resulting demolded seat cushion had a weight of 1,405 grams and an excellent flat layer of a soft foam on top of the hard foam as illustrated in FIG. 4B. The hard foam layer was 50 mm thick and the soft foam layer was 30 mm thick measured at 14 cm from the external side of the seating zone.

It should be understood that the present invention may be varied in many ways. Such variations are not to be regarded as a departure from the spirit and scope of the invention, and all such modifications as would be obvious to a person skilled in the art are included within the scope of the following claims.

What is claimed is:

1. A process for preparing a multilayered foam article in a mold arranged so that the bottom surface of the mold is flat or inclined up to 40 degrees to the horizontal plane by foaming and curing a first liquid foam formulation designed to produce a softer foam and a second liquid foam formulation designed to produce a harder foam, characterized in that the process comprises the following steps:

(a) pouring the first liquid foam formulation into the mold strip-wise across a zone of the mold from a mixing head outlet; and (b) pouring the second liquid foam formulation into the mold strip-wise across said zone of the mold, from the same or a different mixing head outlet parallel to the pouring of the first liquid foam formulation but spaced therefrom such that the second liquid foam formulation contacts the mold where the mold has not been wetted by the first liquid foam formulation and allowing the second liquid foam formulation to spread on top of the first liquid foam formulation; characterized in that the mixing head(s) outlet(s) are tilted relative to the vertical plane while the liquid foam formulations are being poured into the mold.

2. The process according to claim 1, characterized in that the liquid foam formulations designed to produce foams of different hardness are poured simultaneously from at least two mixing heads' outlets strip-wise into said zone of the mold along different lines while the mixing heads move above and across said zone of the mold.

3. The process according to claim 1, characterized in that the liquid foam formulations designed to produce foams of different hardness are poured sequentially from a single mixing head strip-wise into said zone of the mold along different lines across said zone of the mold.

4. The process according to any one of claims 1 to 3, characterized in that the first liquid foam formulation designed to produce a soft foam is poured strip-wise into the mold and after an interval of from 0.05 to 10 seconds, the second liquid foam formulation designed to produce a hard foam is poured strip-wise into the mold.

5. The process according to claim 4, characterized in that the first liquid foam formulation is poured strip-wise in a first direction and then the second liquid foam formulation is poured strip-wise in an opposite direction to the line of pouring of the first liquid foam formulation.

6. The process according to claim 4, characterized in that the mold moves relative to the mixing head outlet or outlets during the pouring of the liquid foam formulations.

7. The process according to any one of claims 1, 2 or 3, characterized in that the liquid foam formulations are flexible polyurethane foam formulations.

8. The process according to claim 7, characterized in that an article comprising a layered foam seating area is produced.

9. A process as claimed in claim 8, wherein the pouring of the first and second formulations is carried out along respective lines near an external wall of the mold.

10. A process as claimed in claim 9, wherein said lines are parallel to said wall.

* * * * *